United States Patent Office 3,114,591
Patented Dec. 17, 1963

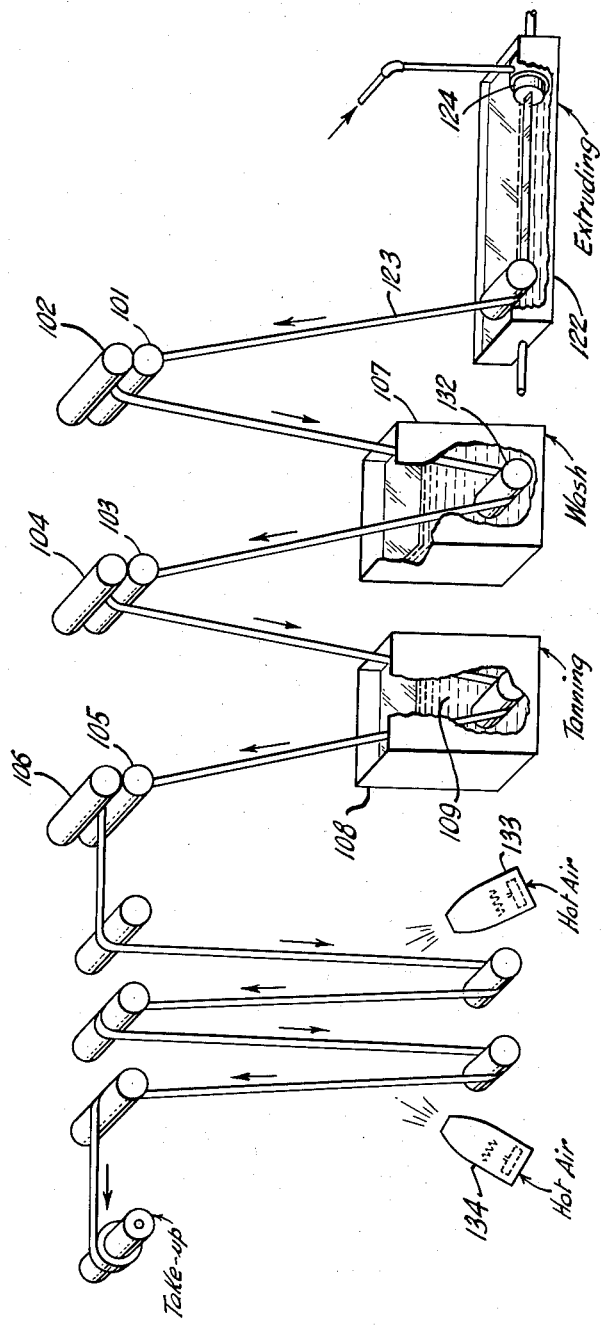

3,114,591
PROCESS FOR THE MANUFACTURE OF SUTURE MATERIAL FROM ANIMAL TENDONS
Joseph Nichols, Princeton, and Thomas Lincoln Reissmann, Bound Brook, N.J., assignors to Ethicon, Inc., a corporation of New Jersey
Filed Apr. 12, 1961, Ser. No. 102,532
3 Claims. (Cl. 18—54)

This invention relates to collagen fibrils, and more particularly, to methods for the manufacture of strand-like materials such as absorbable sutures and ligatures from animal tendons.

For the sake of clarity, the terms used herein are defined as follows:

The term "swollen collagen fibril," as used herein, means a thread-like collagen structure that has been swollen in acid solution to a diameter of about 5,000 to about 90,000 Angstrom units.

The term "ribbon," as used herein, means a long, thin, flat strip of oriented collagen fibrils.

The term "strand," as used herein, means one or more ribbons that have been twisted together and united to form a unitary structure of circular cross-section.

Practically the entire production of absorbable sutures and ligatures is currently made from sheep or beef gut by a process that is both time consuming and expensive, but the current method of manufacture is not adapted to produce a uniform product. The percent of production that is rejected, therefore, for some defect such as lack of tensile strength and lack of uniformity, is large. The starting material, e.g., sheep intestines is available only in limited quantities and one can not predetermine the size of the finished product.

There are also inherent defects in the best obtainable sutures made from gut. The individual sutures may vary widely in cross-section and the length of such a suture is limited by the length of the intestinal material processed. Furthermore, a gut suture will become brittle and decrease in flexibility and strength on aging if fats and other contaminants are not completely eliminated during processing.

In view of the obvious deficiencies of surgical catgut and the disadvantages of the present method of manufacture, many attempts have been made to make a better product from other sources of collagen. Collagen is present in all connective tissue and may be conveniently obtained from hides and tendons.

It is an object of the invention to extrude a satisfactory suture material.

It is another object of the present invention to extrude a pure and homogeneous dispersion of unprecipitated collagen fibrils into a dehydrating bath to produce a ribbon which may be twisted to form a continuous strand having unusual physical properties.

It is also an object of this invention to produce shaped articles of collagen suitable for surgical use by continuously extruding a dispersion of unprecipitated collagen fibrils into a dehydrating bath.

It is a further object of this invention to produce a continuous unitary strand from ribbons of oriented collagen fibrils having characteristics superior to surgical sutures derived from gut.

Yet another object of this invention is to prepare absorbable surgical sutures from connective tissue, such as mammalian tendon.

It is also an object of this invention to produce sterile surgical sutures of exceptional strength.

The objects of this invention may be realized by extruding a homogeneous dispersion of pure swollen collagen fibrils into a dehydrating bath to form a ribbon, film or tube that can be cut to form ribbons. The ribbon may be further processed, for example, by wetting out, washing, tanning, twisting, stretching and bonding in proper sequence to obtain a strand of uniform diameter and physical properties. In the practice of the present invention, therefore, a dispersion of swollen collagen fibrils is extruded to form a continuous film or ribbon in which the individual collagen fibrils are oriented parallel to the direction of extrusion. The ribbon is then further processed to form a rounded strand of uniform cross-section.

The basic raw material entering into the manufacture of extruded collagen sutures by the present process consists of a dispersion of swollen collagen fibrils which may originate in different animal species or in different tissues within a single species. These collagen fibrils are characterized by having a uniform diameter, a periodic cross-banding measuring about 640 angstroms per unit and the ability to swell reversibly in aqueous acid solution. Collagen fibrils from beef leg tendon are preferred for the present process.

It is important in preparing a dispersion of swollen collagen fibrils suitable for extrusion that the removal of impurities naturally present in mammalian tendon, and the separation of the collagen fibrils to form a homogeneous dispersion, be effected under conditions that avoid solution or degradation of the collagen. The tensile strength of the extruded product is dependent upon retaining the original collagen fibril structure.

In the extrusion process, the homogeneous dispersion of swollen collagen fibrils is extruded into a ketone dehydrating bath through a slit or annular opening which orients the individual collagen fibrils in a direction parallel to the surface of the extruded film. It has been postulated that the ultimate strength of a collagen ribbon is related to the lateral bonds between collagen fibrils. Thus, a parallel alignment of the individual fibrils will provide a maximum number of lateral bonds, and the maximum tensile strength.

The extruded film is stretched to further orient the collagen fibrils and may be collected directly when dry on a take-up spool or further processed by contact with liquids. The film or ribbon is stored as such and may be processed at any future time to form a rounded strand. The size of the ribbon used, and the number of ribbons that are twisted together, will determine the diameter of the final strand. Thus, the present process is convenient for manufacturing sutures of different sizes, and particularly large size sutures.

The invention will appear more clearly from the following detailed description when taken in connection with the drawing which is a schematic view of a machine that may be used in the manufacture of a continuous collagen ribbon by extrusion.

The raw material for the articles of this invention is the collagen fibril which may be obtained from mammalian tendon. Whales are a large source of collagen and whale tendon collagen is a satisfactory starting material. Pork, sheep and beef tendon are also satisfactory. The best results to date have been obtained by using the Deep Flexor tendon of cattle.

The swelling solution may be an aqueous solution containing about 0.2% to about 1.0% of cyanoacetic acid. The preferred pH of the swelling solution is 2–3.

The collagen dispersion may be extruded either vertically or horizontally. For the purpose of our description, however, the extrusion process will be described with reference to the horizontal extrusion machine illustrated in the drawing.

The machine to be described has been designed for the continuous extrusion of a ribbon from an aqueous dispersion containing about 1 percent of pure swollen collagen fibrils. The dehydrated ribbon is about 2.5 mils in thickness and about 500 mils wide but it will be understood that modifications to produce ribbons of different sizes are well within the scope of this invention. An alternate process is to extrude the dispersion of collagen fibrils through an annular orifice to form a tube which may be cut lengthwise into ribbons.

It will be noted that the collagen dispersion is forced through a narrow slit into a recirculating dehydrating bath. The ribbon is pulled upward out of the bath by nip rollers 101 and 102 and is stretched between the nip rollers 101 and 102 and the nip rollers 103 and 104. Provision is made to continuously treat the moving ribbon with a liquid after it leaves rollers 101 and 102. The nip rollers 105 and 106 impart additional stretch and orientation to the ribbon.

Referring now to the drawing, the dehydrating bath enters the container 122 from one end and below the extrusion orifice and flows through the container 122 cocurrent with the extruded collagen 123. The circulation rate of the dehydrating bath is generally about 850 cubic centimeters per minute, but may be increased to more than 1200 cubic centimeters per minute. A circulation rate of about 850 cubic centimeters per minute provides a rapid change of the bath and the flow helps to carry the freshly extruded ribbon away from the extrusion opening. A circulation rate as low as 50 cubic centimeters per minute, however, will provide a satisfactory change of the spin bath. Circulation rates above about 1200 cubic centimeters per minute may cause the extruded ribbon to break.

The extrusion orifice 124 is a slit about ½ inch wide and 25 mils in cross-section in a brass plate about 1¼ inches in diameter and ¼ inch in thickness. Such an extrusion orifice produces a dehydrated ribbon about 2½ mils in thickness and about 50 mils wide. A larger extrusion orifice (about 1 inch wide and 45 mils in cross-section) produces a ribbon about 100 mils x 4½ mils that may be twisted to obtain a size 2/0 suture.

The extruded collagen is transported by the driven nip rollers 101 and 102, 103 and 104, and 105 and 106. The lower rollers 101, 103 and 105 are preferably nylon and the upper rollers 102, 104 and 106 are constructed of hard rubber. Each pair of nip rollers is geared together so that the upper and lower rollers rotate at the same speed.

When spinning at the rate of about 2.97 cubic centimeters of 1 percent collagen dispersion per minute, nip rollers 101 and 102 are driven at a speed of about 10 r.p.m. At 10 r.p.m., the linear rate of spinning is about 30 inches per minutes Nip rollers 103 and 104 are driven at 14 r.p.m. and since all of the nip rollers are of the same size (about 1 inch diameter) produce a 40 percent stretch in the ribbon between rollers 101 and 102 and rollers 103 and 104. The amount of stretch at this stage may be increased or decreased as desired by varying the relationship between the speeds of the driven rollers 101 and 103. The stretching between rollers 101 and 102 and rollers 103 and 104 provides orientation of the drying ribbon and improves the tensile strength.

Extrusion conditions may, for example, be controlled so that roller 101 is operated at 10 r.p.m., roller 103 is rotated at 14 r.p.m., and roller 105 at 15 r.p.m. Under these conditions, one would obtain, in addition to the 40 percent stretch between rollers 101 and 102 and rollers 103 and 104, another 10 percent stretch between rollers 103 and 104 and rollers 105 and 106. The overall stretch may be varied from about 20 percent to 50 percent, and at the present time, the upper limit of stretch appears to be about 58 percent.

The moving ribbon may be continuously washed and/or tanned in the containers 107 and 108, or a two-step tanning procedure may be used by treating the ribbon as it leaves roller 101 and again as it leaves roller 103. The drawing illustrates a method of contacting a continuously moving ribbon with a wash solution in container 107. The wetted out ribbon returns from a freely rotating idler roll 132 and contacts the tanning bath 109 in a second stage. In its wet condition, the tanned ribbon is stretched an additional 10 percent by the more rapidly rotating nip rollers 105 and 106.

A suitable tanning bath 109 may be made up by adding 4 milliliters of 40 percent aqueous formaldehyde and 1 gram of aluminum ammonium sulfate to 1 liter of water. The aluminum ammonia sulfate acts as a buffer and provides a pH of about 4.2. Two liters of this tanning bath solution will tan approximately 1000 feet of ribbon.

It will be realized of course that, although a horizontal extrusion process has been described above, the same principles may be applied with slight modification to vertically downward or vertically upward extrusion.

The extrusion of a dispersion of swollen collagen fibrils to produce a unitary strand of outstanding properties will be illustrated by the following examples. Throughout the specification, all quantities are expressed in parts by weight unless otherwise indicated.

EXAMPLE I

Preparation of a Collagen Dispersion

The deep flexor tendon of cattle is cleaned of fat, non-collagenous protein, and other extraneous matter, and is sliced on an electric meat-slicing machine (rotary knife) in the frozen condition. The tendon sections are sliced perpendicularly to their longitudinal axis to a thickness of about 15–25 mils.

The sliced tendon is next treated with an enzyme solution to dissolve elastin. The enzyme solution is prepared by agitating 40 parts of malt diastase with 400 parts of water for 10 minutes. The homogeneous dispersion is centrifuged at 2000 r.p.m. for 20 minutes, and the clear aqueous solution from the centrifuging step is vacuum filtered through a "Celite" mat. "Celite" is an inert analytical filtering aid manufactured by the Johns-Manville Company. The filtrate, which is usually slightly acid, is adjusted to pH 7 with a few drops of dilute sodium hydroxide. Distilled water is then added to the neutral enzyme solution to bring the total volume up to 1200 parts. Four hundred parts of the sliced tendon is immersed in this solution, which is then covered with a layer of toluene to prevent mold growth. This tendon-enzyme mixture is incubated at 37.5° C., overnight (15–20 hours).

After incubation, the tendon slices are washed 3 or 4 times by decantation with distilled water and then treated with 1000 parts of water containing 4 grams of "Versene" (ethylene diamine tetrasodium tetraacetate). The tendon "Versene" mixture is incubated for approximately 2 hours at 37.5° C., to remove soluble proteins and lipids. Following this "Versene" treatment, the pH should again be adjusted to 7 if necessary as the tendon slices are easier to handle (less swelling and hydration) in a neutral solution. The tendon slices are again washed by decantation with 5 to 6 changes of distilled water.

The swelling solution is 50% aqueous methanol containing about 0.35%, based on the total solvent weight, of perfluorobutyric acid. In general, the collagen dispersion is easy to process at about 1% solids concentration and the amount of acid-swelling solution may be readily calculated from the weight and solids content of the tendon used. The acid solution is prepared by mixing 6000 parts of methanol with 3987 parts of distilled water. To this aqueous methanol mixture is added 42 parts of perfluorobutyric acid.

The acid aqueous methanol solution is cooled to below 25° C., and is added to a dispersion kettle of sufficient capacity and the processed collagen slices are added to the dispersion kettle while rotating the stirrer at about 60 r.p.m. It is important that the remaining steps in the process be carried out at temperatures below 25° C., and that the temperature of the collagen dispersions not be allowed to exceed this temperature.

Stirring is continued for 3 hours, during which time the individual collagen slices are swollen. The dispersion is then homogenized by repeated passes through a stainless steel rotary metering pump and stainless steel series-connected jets having orifices of 30 mils and 40 mils.

The dispersion of Example I may be dehydrated under mild conditions to recover highly purified collagen. The dispersion may be extruded as described in Example II to form collagen ribbons.

EXAMPLE II

*Spinning the Collagen Dispersion*

The collagen dispersion described above is deaerated under vacuum for 4 hours, aged for 31 hours at 25° C., and 16 hours at 5° C., and is then extruded in the horizontal extrusion machine illustrated in the drawing, into an acetone-ammonia dehydrating bath continuously circulated through the container 122 at the rate of about 900 milliliters per minute. During this run, the ammonia content of the dehydrating bath is maintained at 138 milligrams per liter and the water content is 53 grams per liter.

The speed of the nip rollers 101 and 102, 103 and 104, and 105 and 106, is maintained at 10.0, 13.5 and 14 r.p.m., respectively. The ribbon is continuously washed in tank 107 and tanned in the bath 109 which is an aqueous solution containing 4 milliliters of 40% aqueous formaldehyde and 1 gram of aluminum ammonium sulfate per liter. The relative humidity is maintained at 26% throughout the extrusion. The blowers 133 and 134 are operated in a manner such that the tension at the take-up spool is about 175–180 grams. A plurality of the ribbons so obtained may be wet out, twisted together and permitted to dry under tension to form a suture.

If the suture so prepared is placed in a Waring blendor with an excess of dilute aqueous acid solution and agitated violently, the suture will revert to a dispersion of swollen collagen fibrils having the shape and form that existed in the original collagen dispersion prior to extrusion.

EXAMPLE III

A length of the dried and tanned ribbon described in Example II above (about 2.5 mils by 50 mils) is immersed in an aqueous solution containing 10 grams of dextran sulfate per liter for 1 to 3 minutes. Other polysaccharides may be used as a bonding agent alone or in combination with dextran sulfate.

The wetted-out ribbon is twisted under tension (about 5 twists per linear inch) and is permitted to dry at room temperature under a tension of about 0.3 to 0.5 pound. The relative humidity during this drying step is maintained at about 50%. Under these conditions, the twisted ribbon stretches to a length about 10% greater than the original length of the dried ribbon. When the twisted ribbon has dried thoroughly (about 15 hours), the cord may be polished in a centerless grinder to a diameter of about 6.5 mils (size 5/0).

The size 2/0 suture (diameter about 15 mils) may be conveniently prepared by twisting together five of the ribbons (2.5 mils x 50 mils) that have been wetted out with dextran sulfate solution as described above. The tension applied to the twisted ribbon (about 4 twists per linear inch) during drying is about 2.5 pounds.

Plasticizing agents such as diethylene glycol, cross-linking agents such as the acetal condensation product described in Patent No. 2,786,081, and tanning agents such as chromium compounds may be added to the ribbon treatment bath prior to the twisting process.

The dried strand, after polishing in a centerless grinder are round and flexible and the tensile strength characteristics exceed the requirement set out in the Pharmacopoeia of the United States, vol. XV, page 708.

EXAMPLE IV

Random samples are cut from different sections of the continuous strand prepared from a single ribbon and polished to size 5/0 as described in Example III above. Each sample is 5 feet in length. These samples are packaged in "Kel-F" tubes (tubes of trifluorochloroethylene polymer) containing 90% isopropyl alcohol and 10% by volume water and the samples sterilized by electron beam irradiation ($3 \times 10^6$ rads). The rad is a unit of measurement of absorbed irradiation and is equivalent to 100 ergs per gram. The average dry straight tensile strength of these random samples is 2.00 pounds. The average dry knot tensile strength is 1.27 pounds. The average wet knot tensile strength is 0.95 pound.

By the process described above, one may obtain absorbable sutures that are superior to sutures prepared from intestines, both in strength and uniformity. The sutures of the present invention retain more than half of their strength (straight tensile) 6 or 7 days after being implanted in the animal body. The rate of digestion in the animal tissues is of course dependent upon the degree of tanning. Chrome tanned strands will retain more than half of their tensile strength for about 15 days after being implanted in the animal body.

While the invention has been described in detail according to the preferred manner of carrying out the process and yielding the products, it will be obvious to those skilled in the art, after understanding the invention, that changes and modifications may be made therein without departing from the spirit or scope of the invention and it is intended in the appended claims to cover such changes and modifications.

The present invention is a continuation-in-part of our co-pending application Serial No. 800,033, filed March 17, 1959, now abandoned.

What is claimed is:

1. A process for the manufacture of suture material from animal tendons, which comprises extruding a homogeneous dispersion of substantially pure swollen collagen fibrils through a slit into a flowing, confined acetone-ammonia dehydrating bath to form a ribbon, and twisting, stretching and drying said ribbon to form a suture.

2. A method according to claim 1 in which the ribbon is stretched in two stages to further orient the collagen fibrils.

3. A method according to claim 2 in which the ribbon is tanned after stretching.

References Cited in the file of this patent

UNITED STATES PATENTS

| | | |
|---|---|---|
| 1,366,166 | Criggal | Jan. 18, 1921 |
| 2,039,262 | Schulte | Apr. 28, 1936 |
| 2,374,201 | Highberger et al. | Apr. 24, 1945 |
| 2,461,602 | Hollihan | Feb. 15, 1949 |
| 2,475,697 | Cresswell | July 12, 1949 |
| 2,485,958 | Cresswell | Oct. 25, 1949 |
| 2,493,943 | Bower | Jan. 10, 1950 |
| 2,537,979 | Eberl | Jan. 16, 1951 |
| 2,598,608 | Salo et al. | May 27, 1952 |
| 2,637,321 | Cresswell | May 5, 1953 |
| 2,748,774 | Novak | June 5, 1956 |

FOREIGN PATENTS

| | | |
|---|---|---|
| 176,323 | Switzerland | July 1, 1935 |
| 689,582 | Great Britain | Apr. 1, 1953 |